G. A. WING.
Stove Grate.
No. 86,616. Patented Feb. 2, 1869.
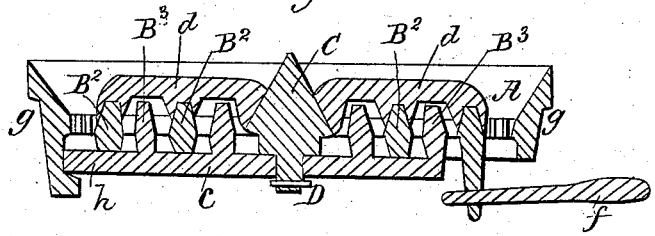
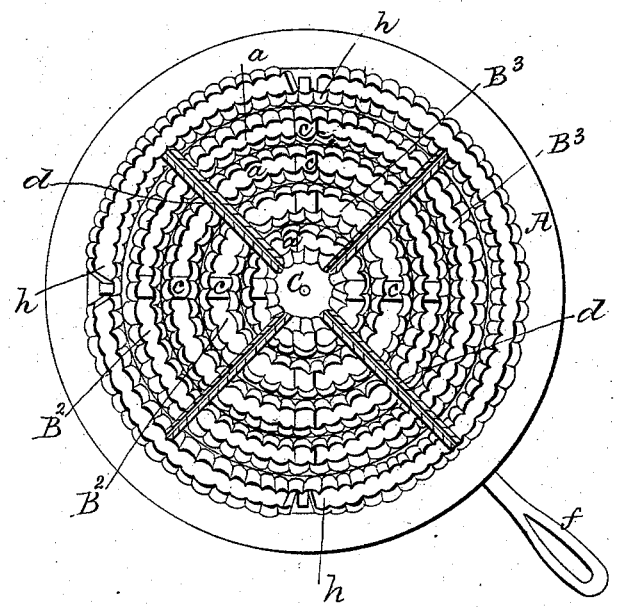
Witnesses;
Robert Ewing
Thos. Houghton
Inventor
George A. Wing

GEORGE A. WING, OF ALBANY, NEW YORK.

*Letters Patent No. 86,616, dated February 2, 1869.*

STOVE-GRATE.

The Schedule referred to in these Letters Patent and making part of the same.

*To all whom it may concern:*

Be it known that I, GEORGE A. WING, of Albany, in the county of Albany, and State of New York, have invented a new and improved Grate for Stoves and Furnaces; and I do hereby declare that the following is a full, clear, and exact description thereof, reference being had to the accompanying drawings, form a part of this specification, and to the letters of reference marked thereon, in which—

Figure 1 is a top view of my invention.

Figure 2 is a vertical central section, taken on a plane running from front to back.

Similar letters of reference indicate like parts.

To enable others skilled in the art to make and use my invention, I will proceed to describe its construction and mode of operation.

My invention consists in constructing a circular grate of two series of concentric rings or bars, the lower series stationary, and the upper series movable about a central pivot, D.

$B^3$ designates the lower series, or stationary series, of concentric rings. They are attached to and supported upon two intersecting cross-bars, $c\ c$, running underneath them, as may be seen in figs. 1 and 2.

The whole grate is supported and kept in place by the lower cross-bars $c\ c$, whose ends project in three points beyond the outer and lower concentric ring $B^3$, as shown at $h\ h\ h$, in fig. 2. It will be seen, by inspection of this figure, that the grate may be dumped by depressing the shaker $f$.

$B^2$ designates the upper series of concentric rings, which are united together by four cross-bars $d$, attached to their tops, as shown in fig. 1. Said concentric rings $B^2$ are further united to a solid, central, corrugated, conical piece, C, with which they are rotated between the lower or stationary rings $B^3$, by means of the shaker $f$, in the well known and usual manner.

A designates a ring corrugated on its inner edge, and having a rebate, $g$, on its outer and top edge, by which it may be suspended in any suitable-sized stove or furnace.

Both sides of the two series of concentric rings are corrugated, as shown at $a\ a$, in fig. 2.

It will be seen from the above description that the solid, conical centre C, the upper concentric rings $B^2$, and their connecting-bar $d$, are all caused to rotate between the lower series, or stationary concentric rings $B^3$, and, because of the corrugations $a\ a$ around the conical centre C, on the inside of the outer sustaining-ring A, and on both sides of the two series of concentric rings $B^2$ and $B^3$, that all slag and clinkers may be easily broken up by rotating the grate in the usual and well-known manner, by means of the shaker $f$.

It will also be seen that this grate may be easily placed in any stove or furnace of suitable size, by first suspending the outer ring A within the fire-chamber of the same; and then the grate itself, by means of the cross-bars $c\ c$, under its bottom, may be put into place within the ring A.

Having described my invention, and its mode of operation,

What I claim as new, and desire to secure by Letters Patent, is—

1. The combination of the two series of concentric rings, or grate-bars, $B^2$ and $B^3$, one series stationary and the other movable, operating substantially as and for the purpose herein specified and shown.

2. In a circular grate, constructed of two series of concentric rings, $B^2$ and $B^3$, the construction of corrugations $a\ a$ in the same, for the purpose of breaking up the clinkers or slags in the fire-chamber at the top of the grate, substantially as herein shown and described.

3. In a circular grate, constructed of two series of concentric rings, $B^2$ and $B^3$, as herein described, the employment of an outside ring A, for sustaining the grate in the stove, in combination with the two sustaining cross-bars $c\ c$, underneath the stationary concentric rings $B^3$, substantially as and for the purpose herein set forth.

4. The movable corrugated centre C, in combination with the movable concentric rings $B^2$, and the cross-bars $d\ d$, above the movable concentric rings $B^2$, substantially as and for the purpose herein set forth.

GEORGE A. WING.

Witnesses:
 ROBERT B. WING,
 THOS. HOUGHTON.